(12) United States Patent
Lavergne

(10) Patent No.: US 9,696,227 B2
(45) Date of Patent: Jul. 4, 2017

(54) DEVICE FOR MEASURING THE CHAIN FORCE IN A BICYCLE

(71) Applicant: Patrice Lavergne, Monteynard (FR)

(72) Inventor: Patrice Lavergne, Monteynard (FR)

(73) Assignee: BH BIKES EUROPE S.L., Vitoria-Gasteiz (Alava) (ES)

( * ) Notice: Subject to any disclaimer, the term of this patent is extended or adjusted under 35 U.S.C. 154(b) by 0 days.

(21) Appl. No.: 14/919,131

(22) Filed: Oct. 21, 2015

(65) Prior Publication Data

US 2016/0107712 A1 Apr. 21, 2016

(30) Foreign Application Priority Data

Oct. 21, 2014 (EP) .................................... 14382410

(51) Int. Cl.
| | |
|---|---|
| *G01L 1/04* | (2006.01) |
| *G01L 5/04* | (2006.01) |
| *B62M 6/50* | (2010.01) |
| *G01L 1/18* | (2006.01) |
| *G01L 5/13* | (2006.01) |
| *B62J 99/00* | (2009.01) |
| *B62M 9/16* | (2006.01) |

(52) U.S. Cl.
CPC ............. *G01L 5/047* (2013.01); *B62M 6/50* (2013.01); *G01L 1/18* (2013.01); *G01L 5/136* (2013.01); *B62J 2099/002* (2013.01); *B62M 9/16* (2013.01)

(58) Field of Classification Search
CPC .. B62M 1/00; B62M 6/50; G01N 3/08; F16H 7/08; G01L 5/102; G01L 5/136; G01L 1/18; G01L 1/04
USPC ..................................................... 73/862.636
See application file for complete search history.

(56) References Cited

U.S. PATENT DOCUMENTS

| | | | |
|---|---|---|---|
| 7,814,800 B2 | 10/2010 | Roovers | |
| 2007/0099735 A1* | 5/2007 | Roovers | ................... B62M 6/40 474/101 |
| 2012/0152033 A1 | 6/2012 | Hsiao | |

FOREIGN PATENT DOCUMENTS

| | | |
|---|---|---|
| WO | WO 01/30643 A1 | 5/2001 |
| WO | WO 03/073057 A1 | 9/2003 |

OTHER PUBLICATIONS

European Search Report, mailed Mar. 13, 2015 in connection with European Application No. EP 14 38 2410.

* cited by examiner

*Primary Examiner* — Lisa Caputo
*Assistant Examiner* — Octavia Hollington
(74) *Attorney, Agent, or Firm* — Gary J. Gershik; Cooper & Dunham LLP

(57) ABSTRACT

The present invention relates to a device for measuring the force present in the drive chain of an electric bicycle that basically comprises a metal plate (1) with an axle area for being attached to one end of the wheel axle (2) to receive the force F1 applied to the bicycle's frame by said wheel axle (2) in the longitudinal axis of the bicycle and a frame area for being to the bicycle frame were said frame area comprises tapped holes (3) to be attached to the bicycle frame, at least a force sensor (4), an adjusting screw (5) to adjust said force sensor (4), an elastic overload protection element (6), such as an helical spring, designated to maintain the sensor (4) within a secure load range for protecting it from overloads, and a system of transmission for receiving the horizontal force component F1' and transmitting a proportional elastic reaction force to the force sensor (4).

9 Claims, 2 Drawing Sheets

DEVICE FOR MEASURING THE CHAIN FORCE IN A BICYCLE

TECHNICAL FIELD OF THE INVENTION

The invention relates to a device for measuring the force present in the drive chain of an electric bicycle.

More specifically, the mechanism of the present invention is of the type being fixed to the bicycle frame and to the wheel axle in order to sense the horizontal component of the force applied to the frame by the wheel axle.

BACKGROUND OF THE INVENTION

Electrically supported bicycles or electric bicycles are well known and their use is becoming more common everyday and everywhere.

As it is known, such a electric bicycles are bicycles with an electrical auxiliary motor, wherein the user drives the bicycle by exerting pedal force, and wherein the auxiliary motor exerts an auxiliary drive force that depends on the exerted pedal force so that, the greater the pedal force, the greater the auxiliary drive force exerted by the auxiliary motor. In other words, the auxiliary motor is driven in order to generate a torque proportional to the pedaling force of the biker and so to the chain force.

Therefore, in order to carry out its work the auxiliary motor needs an input signal indicative for the magnitude of the exerted pedal force, or at least indicative for the magnitude of the drive force present in the chain.

To achieve this, some proposals in the state of the art measure signals indicative for the magnitude of the drive force present in the chain. For example, in WO-01/30643 a measuring signal is obtained by measuring a deformation of the bicycle frame when a cyclist exerts a pedal force or in WO-03/073057, where the bending of the rear axle is measured.

However, said examples of the state of the art are not appropriate for bicycles with a derailleur gear system, where the cyclist may choose among several gears, i.e., which chain wheel is in use. This means that the chain is displaced in horizontal direction along the rear axle to engage with another chain wheel distorting the generated measuring signal and therefore the measure exerted by the chain.

To solve this problem it is know U.S. Pat. No. 7,814,800, which describes a method and a device for obtaining a well-usable measuring chain force signal by sensing the horizontal component of the force applied to the bicycle's frame by the wheel axle end in the longitudinal axis of the bicycle.

More precisely, U.S. Pat. No. 7,814,800 describes a method for measuring the horizontal wheel axle force by fixing a device to the wheel axle end. Said device being a flexible metal plate, firmly screwed onto the bicycle frame, and to sense the relative horizontal displacement between the frame and the wheel axle end. The relative horizontal displacement of the wheel axle end is sensed by a displacement sensor made up of a magnet, linked to the flexible part and a Hall sensor linked to the fixed part of the metal plate. As the chain force is proportional to the relative displacement, it is deducted from the electric signal delivered by this displacement sensor.

However, although this type of chain force sensor works pretty well once perfectly set up, the practice brings to light some inconstancy regarding signal response.

Specifically, the Hall sensor of U.S. Pat. No. 7,814,800 varies its output voltage in response to the magnetic field created by the magnet, which at the same time varies its position due to the forces exerted to the chain. As the magnetic field varies proportionally with a third of the distance, this inconstancy is due to unavoidable tiny changes in the relative positioning between the magnet and the hall sensor in severe operating conditions.

Additionally, as this displacement must be free of constraints, the water and dust proofing of the sensor becomes a difficult task.

DESCRIPTION OF THE INVENTION

The device for measuring the chain force in a bicycle of the present invention solves the drawbacks of the state of the art mentioned above insofar as it allows a smart integration of the sensor, a good reliability of the measure and an easy sealing that allows working in severe conditions with no need for maintenance.

To achieve this, the device of the invention is based on the use of a force sensor instead of a displacement sensor in order to measure the chain force directly.

Specifically, the device of the invention comprises a metal plate attached to the bicycle frame and to the end of the rear wheel axle, were the metal plate is machined in such a way that the wheel axle displacement induces proportional elastic reaction forces to a force sensor.

More specifically, the metal plate comprises two main areas:

An axle area, which is the area attached to one end of the wheel axle to receive the force applied to the bicycle's frame by the wheel axle end in the longitudinal axis of the bicycle, and A frame area, which is the area attached to the bicycle frame and where the force sensor is placed.

Thus, the axle area of the metal plate receives the chain force F1 through the end of the wheel axle so that a first system of transmission transmit its horizontal force component F1' as the input to a second system of transmission and where the output of said second system is connected to the force sensor.

The second system reduces to a negligible amount the corresponding horizontal displacement of the wheel axle and transforms it into proportional elastic reaction forces which are delivered as the input for the force sensor. In this way, the sensor input force remains proportional to the wheel axle force along the whole range of measurement. In other words, the ratio sensor load/chain force complies with the measurement range of the sensor.

Afterwards, the signal at the output of the sensor is used by a controller of the bicycle via an electronic board, so that the auxiliary motor is driven in order to generate a torque proportional to the pedaling force of the biker and so to the chain force.

DESCRIPTION OF THE DRAWINGS

To complement the description that is being made and for the purpose of aiding to better understand the features of the invention according to a preferred practical embodiment thereof, a set of drawings is attached as an integral part of said description in which the following is depicted with an illustrative and non-limiting character.

PREFERRED EMBODIMENT OF THE INVENTION

Figure 1:
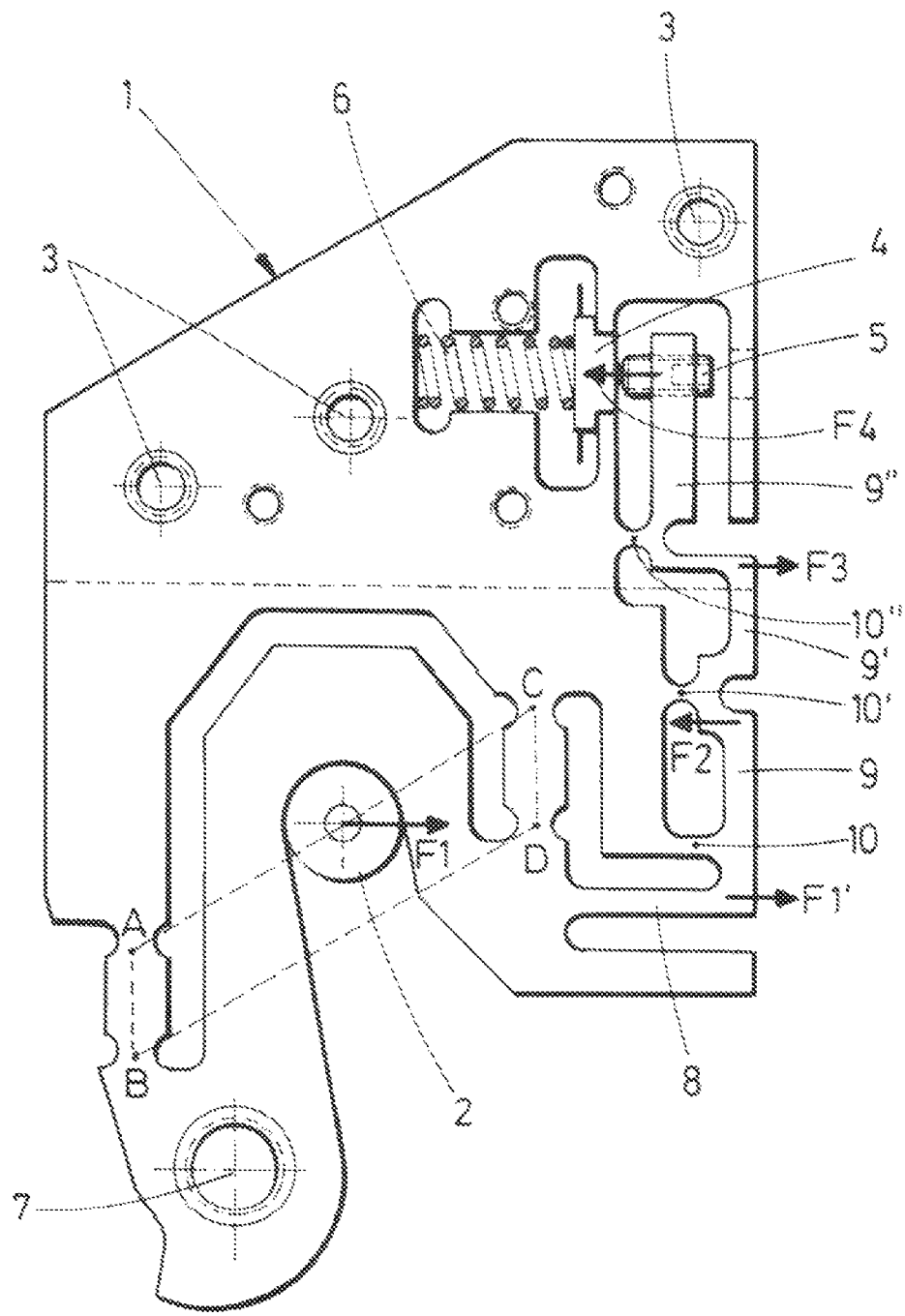
FIG. 1 shows a schematic plan view of the device for measuring the chain force of a chain.

In view of the described drawings and according to a preferred embodiment, it can be seen how the device of the invention comprises a metal plate (1) attached to the bicycle frame (not depicted) and to the end of the rear wheel axle (2), and where the metal plate (1) comprises two main areas:

An axle area attached to one end of the wheel axle (2) comprising:
  a first system of transmission to transmit the horizontal force component F1' of the force applied to the bicycle's frame by the wheel axle (2) as the input to a second system of transmission.
    According to a preferred embodiment, said first system of transmission is formed by two vertical arms or link bars AB-CD machined into the metal plate (1), were said points ABCD are flexure or weaker points that constitute points of articulation forming a parallelogram.
    More specifically, as can be seen on FIG. 1 link bar AB is placed above the tapped hole (7) to fix the derailleur and at the left of the wheel axle (2), whereas link bar CD is placed above link bar AB and at the right of the wheel axle (2), thus creating a parallelogram.
    Thus, the equivalent horizontal force component F1' applied to the bicycle's frame by the wheel axle (2) will be transmitted to a pushing arm (8) located at the input of the second system of transmission by the imaginary line joining points BD, parallel to the imaginary line joining points AC.

A frame area comprising:
  tapped holes (3) or the like to be attached to the bicycle frame;
  at least a force sensor (4),
  an adjusting screw (5) to adjust said force sensor (4),
  an elastic overload protection element (6), such as an helical spring, designated and calibrated to be compressed before the maximum load the sensor (4) can withstand is exceeded in order to maintain the sensor (4) within a secure load range for protecting it from overloads, and
  a second system of transmission for receiving the horizontal force component F1' via the pushing arm (8) and transmitting said component F1' transformed into proportional elastic reaction forces to the force sensor (4).
    However, due to size restrictions that the metal plate (1) must meet, the force sensor (4) must also be small, which in turn limits the maximum load said force sensor (4) can support. For example, in the case of commercial force sensor FSS1500 Honeywell™ sensor, which satisfies size conditions for this application, the operating range is 1.5 kg and the maximum load is 4.5 kg.
    Thus, it would be impossible to apply component F1' applied to the bicycle's frame by the wheel axle (2) directly, which may be up to 200 kg, to a force sensor (4) of this kind.
    Thus, according to a preferred embodiment the metal plate (1) is machined so that the second system comprises a plurality of levers in cascade that drastically reduces the horizontal displacement of the wheel axle (2) to a fraction of a micrometer, but giving the force sensor (4) a proportional elastic reaction force to be measured.
    In addition, angular variations due to such small displacement can be neglected.
    More specifically, according to a preferred embodiment depicted on the figures, the metal plate (1) comprises a plurality of levers in cascade as follows:
      A first lever (9), its input being connected to the pushing arm (8) so that the pushing arm transmits the force F1' to the input of the first lever (9);
      A second lever (9'), its input being connected to the output of the first lever (9) so that the first lever (9) transmits a force F2 to the input of the second lever (9');
      A third lever (9"), its input being connected to the output of the second lever (9') so that the second lever (9') transmits a force F3 to the input of the third lever (9");
    Where the output of the third lever (9") transmits a force F4 to the input of the force sensor (4) through the adjusting screw (5).
    Moreover, metal plate (1) also comprises flexure points (10,10',10") at the input of the levers (9,9', 9") respectively in order to create points of articulation where said levers can pivot.
    As it was said before, the ratio sensor load/chain force complies with the measurement range of the sensor, where most of this ratio comes from the levers cascade and the remaining part of this ratio comes from the unavoidable elastic reaction forces at flexure points (10, 10', 10"), and to the flexibility of the arms of first and second levers (9, 9').
    More precisely, and according to a preferred embodiment, the flexibility of the arms of first and second levers (9, 9') is determined by the thickness of the arms and design on purpose to facilitate the setting of the adjusting screw (5).

Also, the mechanical design of the metal plate (1) is so that the mechanical design avoids side effect of the motor torque on the force sensor load.

More precisely, the axle area of the metal plate (1) reacts to the motor torque The reaction torque produces a compression force inside the arm CD, and a traction force inside the arm AB, which results in a slight rotation of the axle area, whose center is located on the imaginary line joining points BD, roughly in the axis of the pushing arm.

This rotation center location prevents generating any horizontal pushing arm movement, and so the motor torque has no side effect on the force sensor load.

Moreover, the pushing arm (8) and the flexure point (10) of the first lever (9) react only to the horizontal component of a shock on the track (traction), and to the chain force (compression), but thank to the aforementioned design vertical shocks have no effect on said pushing arm (8).

Although in the preferred embodiment the chain force is sense at the wheel axle (2) where the derailleur is placed; in a further embodiment of the invention chain force could be sensed at the two ends of said wheel axle (2).

Figure 2:
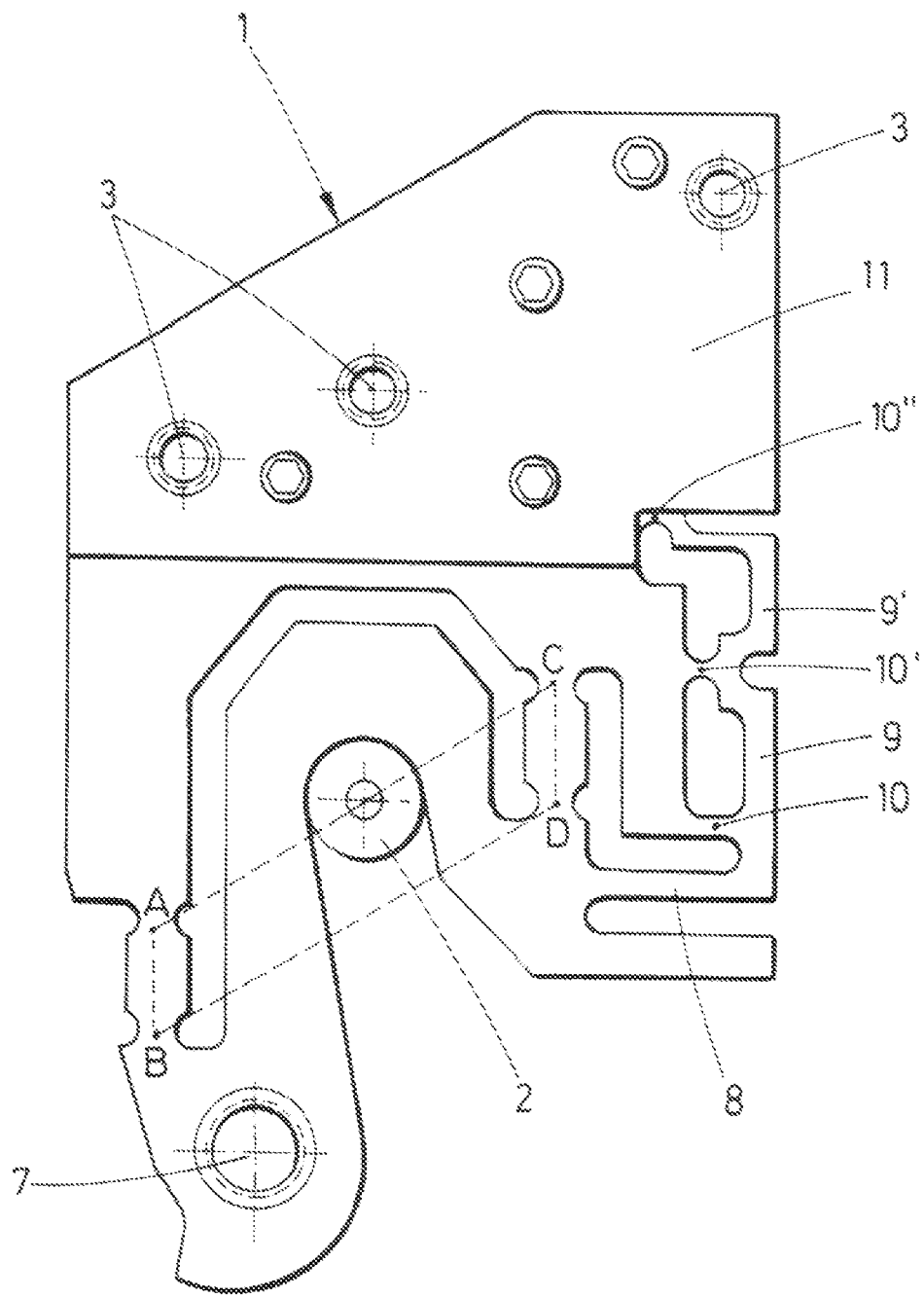
FIG. 2 shows a second schematic plan view of the device of the invention where a cover over the frame area has been arranged.

Finally, as can be seen on FIG. 2, the metal plate (1) can comprise a cover (11) over the frame area in order to protect and seal the force sensor (4).

According to a final preferred embodiment of the invention the metal plate (1) is made of an aluminum alloy.

The invention claimed is:

1. Device for measuring the chain force in a bicycle comprising a metal plate (1), where said metal plate (1) comprises:
   an axle area attached to at least one end of the wheel axle (2) to receive the force F1 applied to the bicycle's frame by said wheel axle (2) in the longitudinal axis of the bicycle, and
   a frame area attached to the bicycle frame, said frame area comprising at least a force sensor (4);
   characterized in that the metal plate (1) is machined in such a way that the axle area comprises a first system for transmitting the horizontal force component F1' of the force F1 to a second system of transmission located in the frame area, so that the horizontal displacement of the wheel axle (2) is transformed into proportional elastic reaction forces which are delivered as the input to the force sensor (4);
   characterized in that the second system comprises a plurality of levers in cascade for reducing the horizontal displacement of the wheel axle (2) and giving the force sensor (4) a elastic reaction force proportional to the force applied to the bicycle's frame by said wheel axle (2);
   characterized in that the plurality of levers in cascade comprises:
      a first lever (9), its input being connected to the pushing arm (8) so that the pushing arm transmits the force F1' to the input of the first lever (9);
      a second lever (9'), its input being connected to the output of the first lever (9) so that the first lever (9) transmits a force F2 to the input of the second lever (9');
      a third lever (9"), its input being connected to the output of the second lever (9') so that the second lever (9') transmits a force F3 to the input of the third lever (9"), and where the output of the third lever (9") transmits a force F4 to the input of the force sensor (4) through an adjusting screw (5).

2. Device for measuring the chain force in a bicycle according to claim 1, characterized in that metal plate (1) comprises flexure points (10,10',10") at the input of the levers (9,9',9") respectively in order to create points of articulation where said levers can pivot.

3. Device for measuring the chain force in a bicycle according to claim 2, characterized in that first system of transmission is formed by two vertical link bars AB-CD machined into the metal plate (1), where the points ABCD are flexure points that constitute points of articulation forming a parallelogram.

4. Device for measuring the chain force in a bicycle according to claim 2, characterized in that it comprises a pushing arm (8) for transmitting the equivalent horizontal force component F1' applied to the bicycle's frame by the wheel axle (2) to the input of the second system of transmission.

5. Device for measuring the chain force in a bicycle according to claim 1, characterized in that comprises an elastic overload protection element (6) to maintain the sensor (4) within a secure load range for protecting it from overloads.

6. Device for measuring the chain force in a bicycle according to claim 1, characterized in that the metal plate (1) comprise a cover (11) over the frame area in order to protect and seal the force sensor (4).

7. Device for measuring the chain force in a bicycle according to claim 1, characterized in that first system of transmission is formed by two vertical link bars AB-CD machined into the metal plate (1), where the points ABCD are flexure points that constitute points of articulation forming a parallelogram.

8. Device for measuring the chain force in a bicycle according to claim 7, characterized in that it comprises a pushing arm (8) for transmitting the equivalent horizontal force component F1' applied to the bicycle's frame by the wheel axle (2) to the input of the second system of transmission.

9. Device for measuring the chain force in a bicycle according to claim 1, characterized in that it comprises a pushing arm (8) for transmitting the equivalent horizontal force component F1' applied to the bicycle's frame by the wheel axle (2) to the input of the second system of transmission.

* * * * *